(12) United States Patent
Kong et al.

(10) Patent No.: US 12,094,152 B2
(45) Date of Patent: Sep. 17, 2024

(54) METHOD FOR FULLY AUTOMATICALLY DETECTING CHESSBOARD CORNER POINTS

(71) Applicant: DALIAN UNIVERSITY OF TECHNOLOGY, Liaoning (CN)

(72) Inventors: Weiqiang Kong, Liaoning (CN); Deyun Lv, Liaoning (CN); Wei Zhong, Liaoning (CN); Risheng Liu, Liaoning (CN); Xin Fan, Liaoning (CN); Zhongxuan Luo, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 448 days.

(21) Appl. No.: 17/442,937

(22) PCT Filed: Mar. 5, 2020

(86) PCT No.: PCT/CN2020/077965
§ 371 (c)(1),
(2) Date: Sep. 24, 2021

(87) PCT Pub. No.: WO2021/138995
PCT Pub. Date: Jul. 15, 2021

(65) Prior Publication Data
US 2022/0148213 A1 May 12, 2022

(30) Foreign Application Priority Data
Jan. 10, 2020 (CN) .......................... 202010027789.5

(51) Int. Cl.
*G06T 7/70* (2017.01)
*G06T 7/90* (2017.01)
(52) U.S. Cl.
CPC . *G06T 7/70* (2017.01); *G06T 7/90* (2017.01)

(58) Field of Classification Search
None
See application file for complete search history.

(56) References Cited

U.S. PATENT DOCUMENTS

2017/0221226 A1* 8/2017 Shen .......................... G06T 7/80

FOREIGN PATENT DOCUMENTS

CN 103927750 A 7/2014
CN 104091324 A 10/2014
(Continued)

OTHER PUBLICATIONS

Wohlfeil, JÃ¼rgen, , et al. "Automatic camera system calibration with a chessboard enabling full image coverage." The International Archives of the Photogrammetry, Remote Sensing and Spatial Information Sciences 42 (2019): 1715-1722. (Year: 2019).*

*Primary Examiner* — Sean M Conner
(74) *Attorney, Agent, or Firm* — MUNCY, GEISSLER, OLDS & LOWE, PC

(57) ABSTRACT

The present invention discloses a method for fully automatically detecting chessboard corner points, and belongs to the field of image processing and computer vision. Full automatic detection of chessboard corner points is completed by setting one or a plurality of marks with colors or certain shapes on a chessboard to mark an initial position, shooting an image and conducting corresponding processing, using a homography matrix H calculated by initial pixel coordinates of a unit grid in a pixel coordinate system and manually set world coordinates in a world coordinate system to expand outwards, and finally spreading to the whole chessboard region. The method has the advantages of simple procedure and easy implementation; the principle of expanding outwards by a homography matrix is used, so that the running speed of the algorithm is fast; and the corner points obtained by a robustness enhancement algorithm is more accurate, so (Continued)

that the situation of inaccurate corner point detection in the condition of complex illumination is avoided.

2 Claims, 4 Drawing Sheets

(56) References Cited

FOREIGN PATENT DOCUMENTS

| | | |
|---|---|---|
| CN | 104517276 A | 4/2015 |
| CN | 108470361 A | 8/2018 |

* cited by examiner

METHOD FOR FULLY AUTOMATICALLY DETECTING CHESSBOARD CORNER POINTS

TECHNICAL FIELD

The present invention belongs to the field of image processing and computer vision, and particularly relates to a method for fully automatically detecting chessboard corner points.

BACKGROUND

As a kind of special corner points, chessboard corner points are widely used in camera calibration and play an important role. Chessboard patterns are widely used for camera calibration because of obvious contrast, simple features, and easy detection and recognition. At the same time, the calibration accuracy of internal and external parameters of a camera is directly determined by the accuracy of chessboard corner point detection, and the accuracy of subsequent image processing tasks is directly determined by the accuracy of the calibrated parameters of the camera. Therefore, improving the accuracy of corner point detection of chessboard images is an important topic in the field of vision measurement.

The existing corner point detection methods are various and are roughly divided into four categories: corner point detection methods based on edge features, corner point detection methods based on gray-scale images, corner point detection methods based on binarization images and corner point detection methods based on mathematical morphology. The commonly used mouse-click type human-computer interaction corner point detection method is just a corner point detection method based on edge features, and Harris or Susan corner point extraction method used by other people is a corner point detection method based on gray-scale images. Some people have designed methods of conducting comparison and extraction by rectangular templates according to the sizes of rectangles of a chessboard, and such methods are corner point methods based on binarization images and mathematical morphology.

The mouse-click type human-computer interaction corner point detection method is to detect corner points by manually selecting the positions of four corner points of the chessboard; although the detection accuracy is high, the time consumption is long, and the operation is very complicated. The corner point detection methods based on gray-scale images are to detect corner points by the variance in gray value of the images near the corner points, but such methods are difficult to achieve good detection accuracy in a complex background. The methods of conducting comparison and extraction by rectangular templates are suitable for the case where the imaging distortion is small, but in fact, the imaging distortion of camera lens is sometimes large, and the illumination is not uniform, so the edges of rectangles are difficult to determine, and the extracted corner points have large errors at the edges. Moreover, none of the above-mentioned methods can cover the whole angle of field of the camera with a chessboard image or extract feature points of edge area by the chessboard image, so that the calibrated internal and external parameters of the camera are certainly not accurate. At the same time, for a chessboard image shot in a complex illumination condition, the situations of chessboard corner point wrong detection and missing detection may occur.

SUMMARY

The present invention aims to overcome the defects of the existing chessboard corner point detection technology and provide a method for fully automatically detecting chessboard corner points, i.e., detection of corner points is completed by setting one or a plurality of marks with colors or certain shapes on a chessboard to mark an initial position, using a homography matrix H calculated by initial pixel coordinates of a unit grid in a pixel coordinate system and manually set world coordinates in a world coordinate system to expand outwards, and finally spreading to the whole chessboard region.

The present invention has the following specific technical solution:

A method for fully automatically detecting chessboard corner points, comprising the following steps:

1) Setting mark(s): setting one or a plurality of marks with certain colors or certain shapes on a chessboard to mark an initial position.
2) Shooting an image: using a camera to collect an image of a chessboard calibration target, and conducting preliminary image processing.
3) Detecting the mark(s): detecting pixel coordinates of the preset mark(s) by a morphological or color detection algorithm.
4) Using the mark(s): determining pixel coordinates of four points of an initial grid according to the pixel coordinates of the mark(s), and calculating exact sub-pixel level corner point coordinates by iteration.
5) Expanding outwards: calculating a homography matrix H according to the sub-pixel level corner point coordinates of the four points and world coordinates thereof in a world coordinate system. Multiplying the homography matrix H with world coordinates of an adjacent grid in the world coordinate system to calculate initial rough sub-pixel level corner points of the other two unknown points of the adjacent grid. Then calculating final sub-pixel level corner points according to the solving principle of sub-pixel level corner points.
6) Enhancing robustness: in the process of expanding outwards, making full use of prior knowledge to eliminate corner points which do not meet conditions on the image of the chessboard calibration target, and finally completing the detection of sub-pixel level corner points on a chessboard image.

The specific process of using the mark(s) in step 4) includes:

4-1) Calculating four rough corner point coordinates of the initial grid in a pixel coordinate system according to geometrical relationship.

4-2) According to the characteristic that "the product of vertical vectors is 0" near a sub-pixel level corner point, letting a sub-pixel level corner point to be solved be q, then the line vector between surrounding points $p_i$ and q thereof is $(p_i-q)$. For any point $p_i$ in a search window, letting the gray gradient at $p_i$ be $G_i$, then the following formula can be obtained:

$$G_i * (p_i - q) = 0$$

Solving the formula by least square method:

$$G_i^T G_i q = G_i^T G_i p_i$$

i.e.:

$$q = (G_i^T G_i)^{-1} * (G_i^T G_i p_i)$$

As a plurality of points $p_i$ are used, letting the quantity of points $p_i$ be N, introducing Gaussian weight, and assuming that the weight at point pi is $w_i$, then the coordinate q of the sub-pixel level corner point is:

$$q = \sum_{i=0}^{N}(G_i^T G_i)^{-1} * (G_i^T G_i w_i p_i)$$

Using sobel convolution to calculate the gray gradient $G_i$ at point $p_i$; for point $p_i$:

$$G_i = [d_x dy]$$

$$G_i^T = \begin{bmatrix} dx \\ dy \end{bmatrix}$$

$$G_i^T G_i = \begin{bmatrix} dxdx & dxdy \\ dxdy & dydy \end{bmatrix}$$

The specific process of expanding outwards in step 5) includes:

5-1) Using the four initial rough corner point coordinates $P_1$, $P_2$, $P_3$ and $P_4$ of the initial grid; according to the imaging principle of the camera, the pixel coordinate of a projection point P in the pixel coordinate system of a point $W(X_w, Y_w, Z_w)$ in the world coordinate system is (u,v), i.e.:

$$Z_c \begin{bmatrix} u \\ v \\ 1 \end{bmatrix} = \begin{bmatrix} \frac{1}{dx} & 0 & u_0 \\ 0 & \frac{1}{dy} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} R & T \\ \vec{0} & 1 \end{bmatrix}$$

$$\begin{bmatrix} X_w \\ Y_w \\ Z_w \\ 1 \end{bmatrix} = \begin{bmatrix} f_x & 0 & u_0 & 0 \\ 0 & f_y & v_0 & 0 \\ 0 & 0 & 1 & 0 \end{bmatrix} \begin{bmatrix} R & T \\ \vec{0} & 1 \end{bmatrix} \begin{bmatrix} X_w \\ Y_w \\ Z_w \\ 1 \end{bmatrix}$$

wherein $Z_c$ is the Z-coordinate of point W in a camera coordinate system, $u_0$ is the center coordinate of the image in x direction, $v_0$ is the center coordinate of the image in y direction, f is a focal length, R is a rotation matrix, T is a translation vector, $f_x$ is a scale factor on u axis, $f_y$ is a scale factor on v axis, dx is a pixel size in x direction, and dy is a pixel size in y direction;

5-2) Generally recording Z=0 of a point in the plane of the chessboard calibration target, so:

$$Z_c \begin{bmatrix} u \\ v \\ 1 \end{bmatrix} = \begin{bmatrix} \frac{1}{dx} & 0 & u_0 \\ 0 & \frac{1}{dy} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} [r_1 r_2 r_3 \ t] \begin{bmatrix} X_w \\ Y_w \\ 0 \\ 1 \end{bmatrix} =$$

$$\begin{bmatrix} f_x & 0 & u_0 & 0 \\ 0 & f_y & v_0 & 0 \\ 0 & 0 & 1 & 0 \end{bmatrix} [r_1 r_2 t] \begin{bmatrix} X_w \\ Y_w \\ 1 \end{bmatrix}$$

wherein $r_1$, $r_2$ and $r_3$ are three column vectors of the rotation matrix R respectively, and t is a translation vector in x and y directions;

Based on that $Z_c P'=HW'$, letting $$A = \begin{bmatrix} f_x & 0 & u_0 & 0 \\ 0 & f_y & v_0 & 0 \\ 0 & 0 & 1 & 0 \end{bmatrix},$$

then the homography matrix H is obtained:

$$H = A[r_1 r_2 t]$$

Therefore, the homography matrix H can be calculated according to the coordinates of the four points in the world coordinate system and the pixel level coordinates of the four points.

The specific process of enhancing robustness in step 6) includes:

6-1) In the process of expanding outwards, comparing side lengths of the current grid with those of a previous one to determine variance. Assuming that the four side lengths of the previous grid are respectively $d_1$, $d_2$, $d_3$, $d_4$ and the corresponding side lengths of the current grid are $d_4$, $d_2$, $d_3$, $d_4$, and setting two thresholds $k_1$, $k_2$; if the relations of $k_1 d_1 \leq d_4 \leq k_2 d_1$, $k_1 d_2 \leq d'_2 \leq k_2 d_2$, $k_1 d_3 \leq d'_3 \leq k_2 d_3$ and $k_1 d_4 \leq d'_4 \leq k_2 d_4$ are simultaneously satisfied, it can be deemed that the requirement for side lengths is satisfied.

6-2) In the process of expanding outwards, comparing tangents of the current four sides with those of previous ones to determine variance. Assuming that the tangents of the previous grid sides are $\theta_1$, $\theta_2$, $\theta_3$, $\theta_4$ and the tangents of the current grid sides are $\theta_4$, $\theta'_2$, $\theta'_3$, $\theta'_4$, and setting two thresholds $m_1$, $m_2$; if the relations of $m_1 \theta_1 \leq \theta_4 \leq m_2 \theta_1$, $m_1 \theta_2 \leq \theta'_2 \leq m_2 \theta_2$, $m_1 \theta_3 \leq \theta'_3 \leq m_2 \theta_3$ and $m_1 \theta_4 \leq \theta'_4 \leq m_2 \theta_4$ are satisfied, it can be deemed that the requirement for tangents is satisfied.

6-3) Delimiting four blocks $block_1$, $block_2$, $block_3$ and $block_4$ near an exact sub-pixel level corner point to be solved, counting the quantity whitepixs of white pixels and the quantity blackpixs of black pixels in a binarization image, and setting a threshold colorTh:

$$colorTh = \frac{abs(whitepixs - blackpixs)}{(whitepixs + blackpixs)}$$

According to the characteristic of the chessboard that black and white grids will appear alternately, the four blocks must include two black blocks arranged diagonally and two white blocks arranged diagonally. If colorTh is smaller than a certain value μ, wherein 0≤μ≤0.2, it indicates that the quantity of black pixels is similar to that of white pixels at this moment, the binarization effect near the corner point to be solved is not good, and the corner point does not meet the requirements and shall be discarded. If whitepixs−blackpixs<0, a block is white; otherwise, the block is black.

6-4) At the same time, for an infrared image, assuming that the pixel value of each point P(i,j) is I(j,i), and counting the average gray value avggrayscale of each block $block_m$ in a gray-scale map of the original image:

$$avggrayscale_m = \frac{\sum_{P(i,j) \in block_m} I(j, i)}{Area_m}$$

The characteristic of the chessboard that black and white grids will appear alternately can also be used to enhance the robustness of corner point detection of a chessboard image shot by an infrared camera. Setting a threshold grayTh; when the difference between the average gray values Δavggrayscale of diagonal blocks is greater than grayTh, or the difference between the average gray values of adjacent blocks is smaller than grayTh, it indicates that the corner point does not meet the requirements and shall be discarded.

The present invention has the following beneficial effects: the present invention designs a method for fully automatically detecting chessboard corner points by using mark(s). After an initial grid is calculated, a homography matrix H is used to spread and expand outwards, and thus to expand to the whole chessboard region. The present invention has the following characteristics:

(1) Full automatic detection of sub-pixel level corner points of chessboard images is realized, and obtained sub-pixel level corner point coordinates can be directly used for solving the internal and external parameters of a camera.

(2) Compared with the existing mainstream methods for detecting chessboard corner points, the method of the present invention does not need manual intervention, and only need to let a program read an image to complete the automatic detection of corner points.

(3). Corner point detection speed is high and will not be influenced by incompleteness of the chessboard, and a collected image only need to carry manually set marks.

(4) For the situation of complex illumination environment or dirty chessboard surface, the method of the present invention has strong robustness and can accurately detect the sub-pixel level corner points on the chessboard.

DETAILED DESCRIPTION

Figure 1:
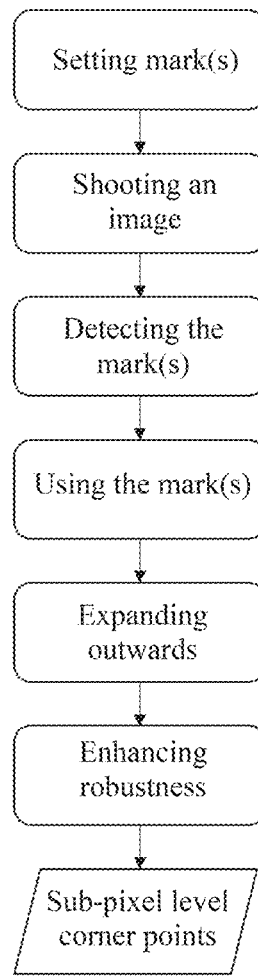
FIG. 1 is an overall flow chart of a solution.
Figure 2:
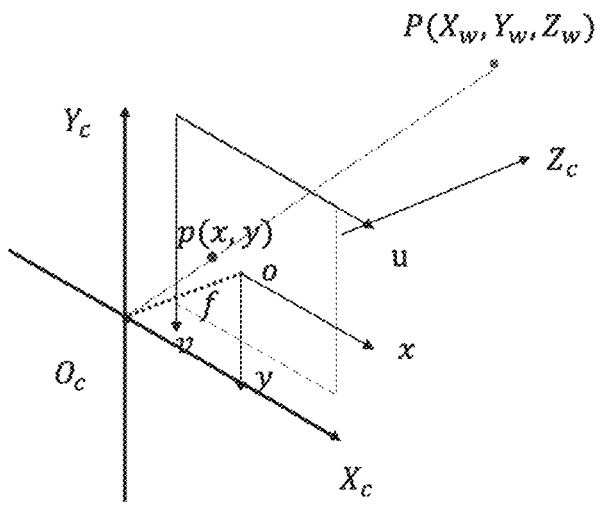
FIG. 2 shows transformation between coordinate systems.
Figure 3:
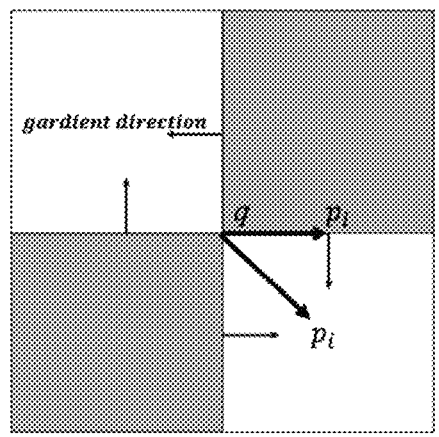
FIG. 3 is a schematic diagram of sub-pixel level corner point detection.
Figure 4:
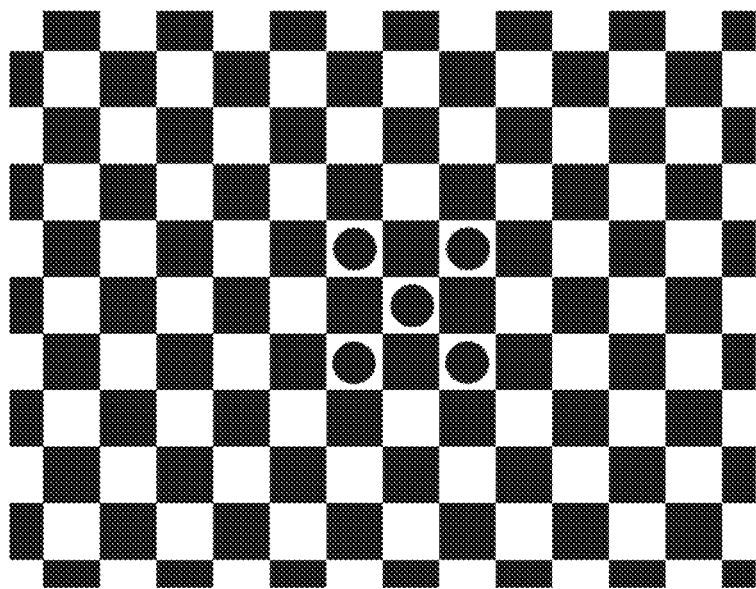
FIG. 4 is a chessboard marking diagram of an embodiment.
Figure 5:
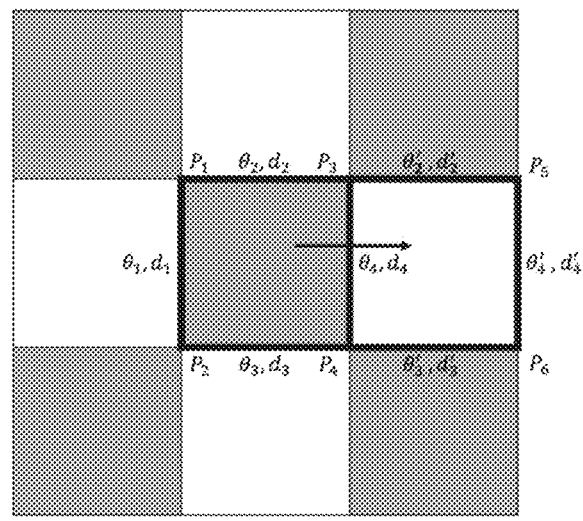
FIG. 5 is a schematic diagram of robustness enhancement of an embodiment.
Figure 6:
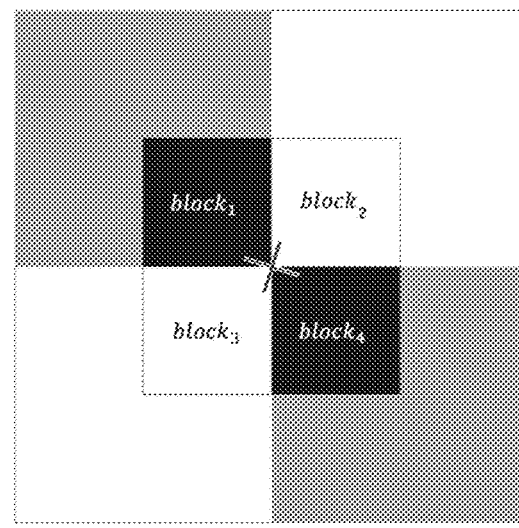
FIG. 6 is a schematic diagram of robustness enhancement of an embodiment.
Figure 7:
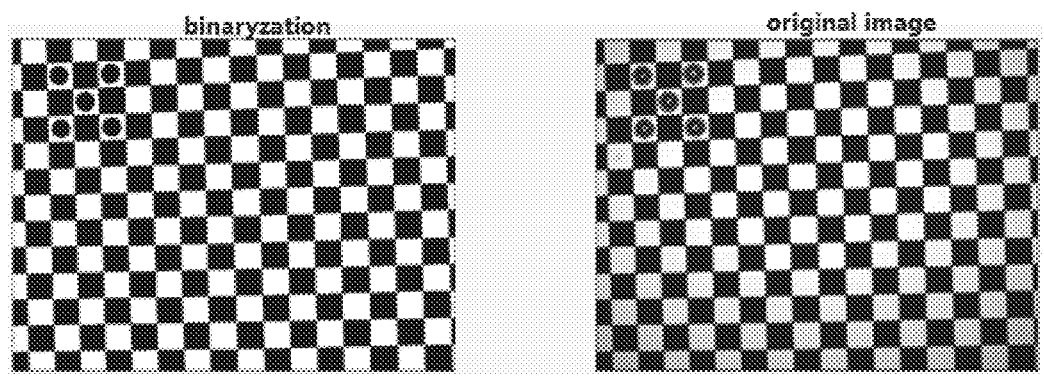
FIG. 7 shows binarization and results.
Figure 8:
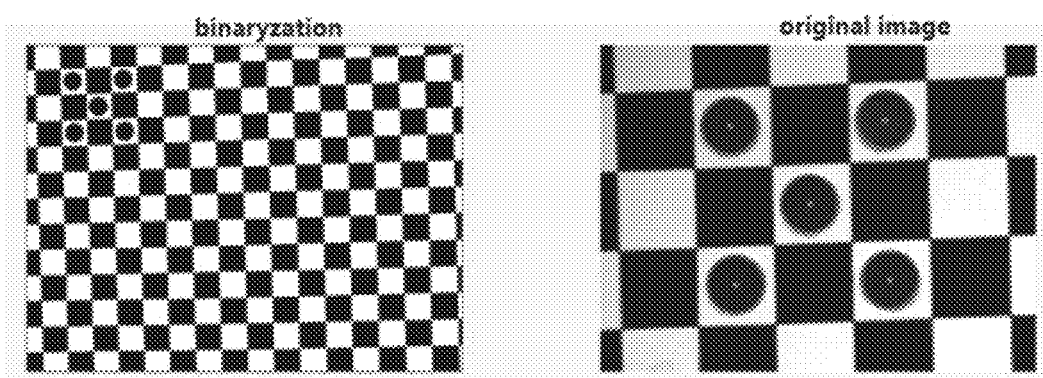
FIG. 8 shows details of corner point detection.

The present invention proposes a corner point detection method based on a chessboard, which realizes full automatic detection of chessboard sub-pixel level corner points by five steps, i.e., setting mark(s), detecting the mark(s), using the mark(s), expanding outwards and enhancing robustness. By taking the example of setting five circles on a chessboard as marks, a specific implementation solution is as follows:

1) First, a printed chessboard calibration target is required, and the calibration target can be a calibration target printed with five circles or a common chessboard calibration target pasted with five circles as markers. The positions of the five circles are distributed in the five white grids of 3*3 chessboard grids in the central region of black and white chessboard, the diameters of the five circles are smaller than the side lengths of the white grids, the serial number of the central circle is recorded as $C_0$, and the serial numbers of the rest four circles are recorded as $C_1$, $C_2$, $C_3$ and $C_4$.

2) The chessboard calibration target is shot by a camera until the chessboard calibration target covers the whole angle of field of the camera. Gray processing and binarization are respectively conducted to a collected image.

3) Five circles in the image are detected by Hough circle detection algorithm, and pixel coordinates of the five circles are recorded. Middle points of four lines connecting the four peripheral circles $C_1$, $C_2$, $C_3$ and $C_4$ to the central circle $C_0$ are calculated and numbered as $P_1$, $P_2$, $P_3$ and $P_4$, and the four points are used as four initial corner points. Four sub-pixel level corner points $P_1$, $P_2$, $P_3$ and $P_4$ are solved by iteration according to the solving principle of sub-pixel level corner points.

4) The points on the chessboard are assigned with values one by one in a world coordinate system according to the four initial sub-pixel level corner points. A homography matrix H can be obtained by the relationship between the four points in the world coordinate system and those in a pixel coordinate system.

5) By using the homography matrix H of the initial four points and the coordinates of a pair of points $P_5$ and $P_6$ to be solved of an adjacent grid in the world coordinate system, pixel coordinates of next two points $P_5$ and $P_6$ can be obtained, and then new sub-pixel level corner points $P_5$ and $P_6$ are solved by iteration according to the solving principle of sub-pixel level corner points.

6) All sub-pixel level corner points on the chessboard are calculated by expanding and spreading outwards from the grid defined by the four points to the positive half axis of the X axis, the negative half axis of X axis, the positive half axis of the Y axis, and the negative half axis of Y axis.

7) In the process of expanding outwards, side lengths of the current grid are compared with those of a previous one to determine variance, it is assumed that the four side lengths of the previous grid are respectively $d_1$, $d_2$, $d_3$, $d_4$ and the corresponding side lengths of the current grid are $d_4$, $d'_2$, $d'_3$, $d'_4$, and two thresholds $k_1$, $k_2$ are set; if the relations of $k_1 d_1 \leq d_4 \leq k_2 d_1$, $k_1 d_2 \leq d'_2 \leq k_2 d_2$, $k_1 d_3 \leq d'_3 \leq k_2 d_3$ and $k_1 d_4 \leq d'_4 \leq k_2 d_4$ are simultaneously satisfied, it can be deemed that the requirement for side lengths is satisfied.

8) In the process of expanding outwards, tangents of the current four sides are compared with those of previous ones to determine variance. It is assumed that the tangents of the previous grid sides are $\theta_1$, $\theta_2$, $\theta_3$, $\theta_4$ and the tangents of the current grid sides are $\theta_4$, $\theta'_2$, $\theta'_3$, $\theta'_4$, and two thresholds $m_1$, $m_2$ are set; if the relations of $m_1 \theta_1 \leq \theta_4 \leq m_2 \theta_1$, $m_1 \theta_2 \leq \theta'_2 \leq m_2 \theta_2$, $m_1 \theta_3 \leq \theta'_3 \leq m_2 \theta_3$ and $m_1 \theta_4 \leq \theta'_4 \leq m_2 \theta_4$ are satisfied, it can be deemed that the requirement for tangents is satisfied.

9) Four blocks $block_1$, $block_2$, $block_3$ and $block_4$ are delimited near an exact sub-pixel level corner point to be solved, the quantity whitepixs of white pixels and the quantity blackpixs of black pixels in a binarization image are counted, and a threshold colorTh is set:

$$colorTh = \frac{abs(whitepixs - blackpixs)}{(whitepixs + blackpixs)}$$

According to the characteristic of the chessboard that black and white grids will appear alternately, the four blocks must include two black blocks arranged diagonally and two white blocks arranged diagonally. If colorTh is smaller than a certain value μ, wherein μ=0.1, it indicates that the quantity of black pixels is similar to that of white pixels at this moment, the binarization effect near the corner point to be solved is not good, and the corner point does not meet the requirements and shall be discarded. If whitepixs−blackpixs<0, a block is white; otherwise, the block is black.

The invention claimed is:

1. A method for fully automatically detecting chessboard corner points, comprising the following steps:
   1) setting marks: setting marks with colors or shapes on a chessboard to mark an initial position;
   2) shooting an image: shooting a chessboard calibration target with a camera to obtain an image of the chessboard calibration target, and conducting preliminary image processing respectively;
   3) detecting the marks: detecting pixel coordinates of the preset marks by a morphological or color detection algorithm;
   4) using the marks: determining pixel coordinates of four points of an initial grid according to the pixel coordinates of the marks, and calculating exact sub-pixel level corner point coordinates by iteration; and
   5) expanding outwards: calculating a homography matrix H according to the sub-pixel level corner point coordinates of the four points and world coordinates thereof in a world coordinate system; multiplying the homography matrix H with world coordinates of an adjacent grid in the world coordinate system to calculate initial rough sub-pixel level corner points of other two unknown points of the adjacent grid; and then calculating final sub-pixel level corner points according to a solving principle of sub-pixel level corner points;
   6) after step 5) enhancing robustness: in the process of expanding outwards, making full use of prior knowledge to eliminate corner points which do not meet conditions on the image of the chessboard calibration target, and finally completing the detection of sub-pixel level corner points on the image of the chessboard calibration target, wherein using the marks in step 4) comprises the following specific steps:
   4-1) calculating four rough corner point coordinates of the initial grid in a pixel coordinate system according to geometrical relationship;
   4-2) according to the characteristic that the product of vertical vectors is 0 near a sub-pixel level corner point, letting a sub-pixel level corner point to be solved be q, then the line vector between surrounding points $p_i$ and q thereof is $(p_i-q)$; for any point $p_i$ in a search window, letting the gray gradient at $p_i$ be $G_i$, then the following formula is obtained:

$$G_i*(p_i-q)=0$$

solving the formula by least square method:

$$G_i^T G_i q = G_i^T G_i p_i$$

i.e.:

$$q=(G_i^T G_i)^{-1}*(G_i^T G_i p_i)$$

letting the quantity of points $p_i$ be N, introducing Gaussian weight, and assuming that the weight at point pi is $w_i$, then the coordinate q of the sub-pixel level corner point is:

$$q = \sum_{i=0}^{N} (G_i^T G_i)^{-1} * (G_i^T G_i w_i p_i)$$

using sobel convolution to calculate the gray gradient $G_i$ at point $p_i$ for point $p_i$:

$$G_i = [dx\, dy]$$

$$G_i^T = \begin{bmatrix} dx \\ dy \end{bmatrix}$$

$$G_i^T G_i = \begin{bmatrix} dxdx & dxdy \\ dxdy & dydy \end{bmatrix}$$

wherein the enhancing robustness in step 6) comprises the following specific steps:
6-1) in the process of expanding outwards, comparing side lengths of a current grid with those of a previous one to determine variance, assuming that four side lengths of the previous grid are respectively $d_1$, $d_2$, $d_3$, $d_4$ and the corresponding side lengths of the current grid are $d_4$, $d'_2$, $d'_3$, $d'_4$, and setting two thresholds $k_1$, $k_2$; when the relations of $k_1 d_1 \leq d_4 \leq k_2 d_1$, $k_1 d_2 \leq d'_2 \leq k_2 d_2$, $k_1 d_3 \leq d'_3 \leq k_2 d_3$ and $k_1 d_4 \leq d'_4 \leq k_2 d_4$ are simultaneously satisfied, the requirement for side lengths is satisfied;
6-2) in the process of expanding outwards, comparing tangents of the current four sides with those of previous ones to determine variance, assuming that the tangents of the previous grid sides are $\theta_1$, $\theta_2$, $\theta_3$, $\theta_4$ and the tangents of the current grid sides are $\theta_4$, $\theta'_2$, $\theta'_3$, $\theta'_4$, and setting two thresholds $m_1$, $m_2$; when the relations of $m_1 \theta_1 \leq \theta_4 \leq m_2 \theta_1$, $m_1 \theta_2 \leq \theta'_2 \leq m_2 \theta_2$, $m_1 \theta_3 \leq \theta'_3 \leq m_2 \theta_3$ and $m_1 \theta_4 \leq \theta'_4 \leq m_2 \theta d_4$ are satisfied, the requirement for tangents is satisfied;
6-3) delimiting four blocks $block_1$, $block_2$, $block_3$, and $block_4$ near an exact sub-pixel level corner point to be solved, counting the quantity whitepixs of white pixels and the quantity blackpixs of black pixels in a binarization image, and setting a threshold colorTh:

$$colorTh = \frac{abs(whitepixs - blackpixs)}{(whitepixs + blackpixs)}$$

according to the characteristic of the chessboard that black and white grids will appear alternately, the four blocks must include two black blocks arranged diagonally and two white blocks arranged diagonally; if colorTh is smaller than a certain value μ, wherein $0 \leq \mu \leq 0.2$, it indicates that the quantity of black pixels is similar to that of white pixels at this moment, the binarization effect near the corner point to be solved is not good, and the corner point does not meet the requirements and shall be discarded; if whitepixs−blackpixs<0, a block is white; otherwise, the block is black;
6-4) for an infrared image, assuming that the pixel value of each point P(i,j) is I(j,i), and counting the average gray value avggrayscale of each block $block_m$ in a gray-scale map of the original image:

$$avggrayscale_m = \frac{\sum_{P(i,j)\in block_m} I(j,i)}{Area_m}$$

using the characteristic of the chessboard that black and white grids will appear alternately to enhance the robustness of corner point detection of a chessboard image shot by an infrared camera; setting a threshold grayTh; when the difference between the average gray values Δavggrayscale of diagonal blocks is greater than grayTh, or the difference between the average gray values of adjacent blocks is smaller than grayTh, it indicates that the corner point does not meet the requirements and shall be discarded.

2. The method for fully automatically detecting chessboard corner points according to claim 1, wherein the expanding outwards in step 5) comprises the following specific steps:

5-1) using four initial rough corner point coordinates $P_1$, $P_2$, $P_3$ and $P_4$ of the initial grid; according to the imaging principle of the camera, the pixel coordinate of a projection point P in the pixel coordinate system of a point $W(X_w, Y_w, Z_w)$ in the world coordinate system is $(u,v)$, i.e.:

$$Z_c \begin{bmatrix} u \\ v \\ 1 \end{bmatrix} = \begin{bmatrix} \frac{1}{dx} & 0 & u_0 \\ 0 & \frac{1}{dy} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} R & T \\ \vec{0} & 1 \end{bmatrix} \begin{bmatrix} X_w \\ Y_w \\ Z_w \\ 1 \end{bmatrix} =$$

$$\begin{bmatrix} f_x & 0 & u_0 & 0 \\ 0 & f_y & v_0 & 0 \\ 0 & 0 & 1 & 0 \end{bmatrix} \begin{bmatrix} R & T \\ \vec{0} & 1 \end{bmatrix} \begin{bmatrix} X_w \\ Y_w \\ Z_w \\ 1 \end{bmatrix}$$

wherein $Z_c$ is the Z-coordinate of point W in a camera coordinate system, $u_0$ is the center coordinate of the image in X direction, $v_0$ is the center coordinate of the image in y direction, f is a focal length, R is a rotation matrix, T is a translation vector, $f_x$ is a scale factor on u axis, $f_y$ is a scale factor on y axis, dx is a pixel size in X direction, and dy is a pixel size in y direction;

5-2) recording Z=0 of a point in the plane of the chessboard calibration target, so:

$$Z_c \begin{bmatrix} u \\ v \\ 1 \end{bmatrix} = \begin{bmatrix} \frac{1}{dx} & 0 & u_0 \\ 0 & \frac{1}{dy} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} [r_1 r_2 r_3 \; t] \begin{bmatrix} X_w \\ Y_w \\ 0 \\ 1 \end{bmatrix} =$$

$$\begin{bmatrix} f_x & 0 & u_0 & 0 \\ 0 & f_y & v_0 & 0 \\ 0 & 0 & 1 & 0 \end{bmatrix} [r_1 r_2 t] \begin{bmatrix} X_w \\ Y_w \\ 1 \end{bmatrix}$$

wherein $r_1$, $r_2$ and $r_3$ are three column vectors of the rotation matrix R respectively, and t is a translation vector in X and y directions;

based on that $Z_c P' = HW'$, letting $$A = \begin{bmatrix} f_x & 0 & u_0 & 0 \\ 0 & f_y & v_0 & 0 \\ 0 & 0 & 1 & 0 \end{bmatrix},$$

then the homography matrix H is obtained:

$$H = A[r_1 r_2 t]$$

therefore, the homography matrix H is calculated according to the coordinates of the four points in the world coordinate system and the pixel level coordinates of the four points.

* * * * *